United States Patent [19]

Barber

[11] Patent Number: 5,549,878
[45] Date of Patent: Aug. 27, 1996

[54] PROCESSES FOR THE DISPOSAL AND RECOVERY OF PHOSSY WATER

[76] Inventor: James C. Barber, 1725 Ingleside Ave., Florence, Ala. 35630

[21] Appl. No.: 448,999

[22] Filed: May 24, 1995

[51] Int. Cl.⁶ .................................................. C01B 25/12
[52] U.S. Cl. ........................ 423/304; 423/322; 423/323
[58] Field of Search ................................. 423/322, 323, 423/304

[56] References Cited

U.S. PATENT DOCUMENTS

| | | | |
|---|---|---|---|
| 2,800,396 | 7/1957 | Udy | 423/323 |
| 3,481,706 | 12/1969 | Veltman et al. | 423/323 |
| 4,450,146 | 5/1984 | Klepeis | 423/323 |
| 4,618,483 | 10/1986 | Spruill et al. | 423/304 |
| 4,686,094 | 8/1987 | Roberts et al. | 423/323 |
| 4,689,121 | 8/1987 | Morgan | 423/323 |
| 4,744,971 | 5/1988 | Scherbel et al. | 423/323 |

*Primary Examiner*—Wayne Langel
*Attorney, Agent, or Firm*—James J. Brown

[57] ABSTRACT

Phossy water is a toxic liquid waste that is generated when elemental phosphorus is manufactured, stored, or processed into phosphorus-containing products. Elemental phosphorus may be prsent as a solution, as colloidal particles, and as settleable particles.

The primary objects of the invention are as follows:
1. To provide a process for the disposal of phossy water stored at the TVA National Fertilizer and Environmental Research Center.
2. To provide a process for the recovery of phossy water that will be generated when hazardous wastes stored at the TVA National Fertilizer and Environmental Research Center are recycled.

Phossy water can be disposed of by using it to quench and granulate molten slag at electric furnaces used to manufacture elemental phosphorus. The elemental phosphorus content of the phossy water is limited to about 2 parts per million.

Phossy water that will be generated during recycling of hazardous wastes can be recovered by using it in the process to produce fluid fertilizers. Phossy water is used instead of process water to manufacture fluid fertilizers. The elemental phosphorus content of the phossy water is not limited to 2 parts per million.

4 Claims, 5 Drawing Sheets

PROCESSES FOR THE DISPOSAL AND RECOVERY OF PHOSSY WATER

BACKGROUND OF THE INVENTION

When water comes in intimate contact with elemental phosphorus, the elemental phosphorus becomes a constituent of the water in one or more of the following forms.

1. Elemental phosphorus dissolves in water. When water is saturated with elemental phosphorus at room temperature the water will contain about 30 parts per billion of elemental phosphorus.
2. Colloidal phosphorus particles become suspended in water.
3. Settleable phosphorus particles become suspended in water.

Water that contains elemental phosphorus in any one of the three forms in commonly called "phossy water."

It is not feasible to avoid the generation of phossy water during the manufacture of elemental phosphorus, during its storage, and during its processing to make phosphorus chemicals. Nevertheless, elemental phosphorus is a highly toxic chemical, and release of phossy water as a liquid waste is a serious threat to marine life.

Late in 1969 a number of massive fishkills occurred in Long Harbour and neighboring regions of Placentia Bay in Newfoundland. The fishkills were attributed to the startup of a phosphorus producing plant at Long Harbour. A study was undertaken by the Fisheries Research Board of Canada to determine the toxicity of yellow phosphorus to marine life. Results of the research were reported in a book entitled "Effects of Elemental Phosphorus on Marine Life," compiled and edited by P. J. Jangaard, Circular No. 2, November 1972, Atlantic Regional Office, Research and Development, Fisheries Research Board of Canada, Halifax, Nova Scotia.

The book is a compilation of technical papers which describe the pollution problem at Long Harbour, give results of research on toxicity of elemental phosphorus and describe methods used to clean up Placentia Bay. An abstract of one of the technical papers is given below as an example to show the relative sensitivity of marine life to small concentrations of elemental phosphorus in water. The paper abstracted is "Yellow Phosphorus Pollution: Its Toxicity to Seawater-Maintained Brook Trout (*Salvelinus fontinalis*) and smelt (*Osmerus mordax*)," by G. L. Fletcher, R. J. Hoyle, and D. A. Horne, Fisheries Research Board of Canada, Halifax Laboratory, Halifax, Nova Scotia.

Yellow phosphorus was lethal to seawater-maintained brook trout and smelt at concentrations as low as 0.5 µg/liter. Trout that were exposed to low concentrations of yellow phosphorus (0.5 and 7.0 µg/liter) for 50 or more hours turned red and showed signs of extensive hemolysis. At death, all trout that had been exposed to 104 µg/liter yellow phosphorus and lower had hematocrits that were significantly lower than those of the controls.

Other species of marine life exhibited similar sensitivity to very small concentrations of elemental phosphorus in water. It is evident that wastes containing any measurable concentration of elemental phosphorus may be a threat to the environment. And by means of chromotography, elemental phosphorus can be detected in water at concentrations as low as 0.5 µg/liter (0.5 part per billion).

Elemental phosphorus was produced commercially at a federal facility now known as the National Fertilizer and Environmental Research Center (NFERC) at Muscle Shoals, Ala., NFERC is operated by the Tennessee Valley Authority (TVA). Production of elemental phosphorus began at NFERC in 1934 and its production was discontinued in 1976.

Much water is used in the manufacture of elemental phosphorus and this results in the generation of phossy water. Elemental phosphorus is produced by smelting a mixture of phosphate ore, reducing carbon, and silica in electric furnaces. The element leaves the furnace in a gas mixture. The gases are then cooled by contacting them with a circulating stream of water,aand elemental phosphorus condenses as a liquid. From this contact between water and elemental phosphorus the water will contain elemental phosphorus in all three forms discussed above.

Part of the elemental phosphorus is condensed as an emulsion called phosphorus sludge which is comprised of dirt, water, and droplets of liquid phosphorus. Although the composition of phosphorus sludge varies widely, the freshly formed emulsion contains approximately equal percentages of dirt, water, and elemental phosphorus. Processes are available for separating elemental phosphorus from impurities in phosphorus sludge, but it has not been feasible to remove all the phosphorus from the dirt and water. Residue from the various recovery processes contains enough elemental phosphorus for the residue to be a toxic waste. Water is used in the recovery processes and phossy water is generated. For example, elemental phosphorus may be separated from the impurities by distillation in which case phosphorus vapor and water vapor will be condensed by contacting gases with water.

Gases from the electric furnace contain particulates. Electrostatic precipitators were used at NFERC to remove the particulates and thereby decrease the quantity of phosphorus sludge that was made. However, particulates were not completely removed from the gas, and the quantity of phosphorus sludge formed during the condensation of elemental phosphorus was reduced but was not eliminated. Particulates removed from the furnace gas are called precipitator dust.

Precipitator dust is comprised of very small particles. Furnace gases, including elemental phosphorus, adsorb on the surfaces of the particulates and the precipitator dust thereby contains elemental phosphorus.

Figure 1:
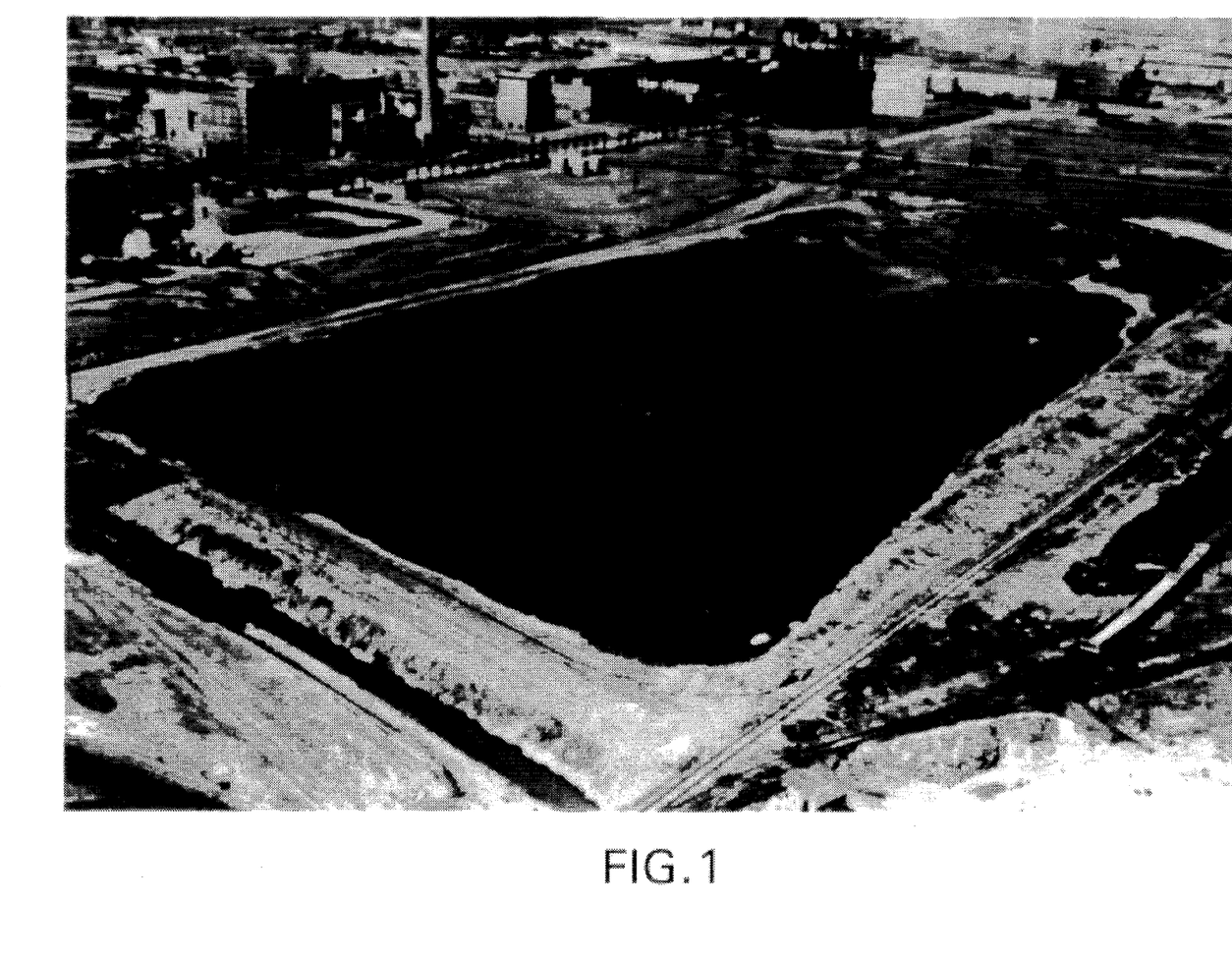
FIG. 1 is an aerial photograph of a 14-acre settling pond that was formerly used as a depository for phosphorus sludge.

When elemental phosphorus was being produced at NFERC, phossy water and phosphorus sludge were discharged into a 14-acre settling pond. FIG. 1 is an aerial view of the settling pond. Also, phosphorus-containing wastes were deposited in other ponds, in sumps, and in tanks. Elemental phosphorus was used as a munition during World War II and during the Korean armed conflict. Munitions-grade elemental phosphorus called for almost complete removal of phosphorus sludge from the element, and this was achieved by washing phosphorus with hot water in a vertical tank. The lower density phosphorus sludge floated on top of the liquid phosphorus and separated by overflowing the tank. The phosphorus sludge contained a substantial amount of elemental phosphorus. During wartime emergencies, production of munitions-grade elemental phosphorus took precedence over phosphorus recovery efficiency. The washings containing elemental phosphorus, phosphorus sludge, and phossy water were discharged into the settling pond, along with phossy water from the phosphorus condensers.

Phossy water was clarified in the pond to separate suspended phosphorus particles. Also, phossy water was diluted with cooling water. After settling and dilution, phossy water was discharged into a stream (Pond Creek) as a waste. The average elemental phosphorus content of the waste phossy water was about 90 parts per billion parts of water, but the waste frequently contained higher concentrations.

Figure 2:
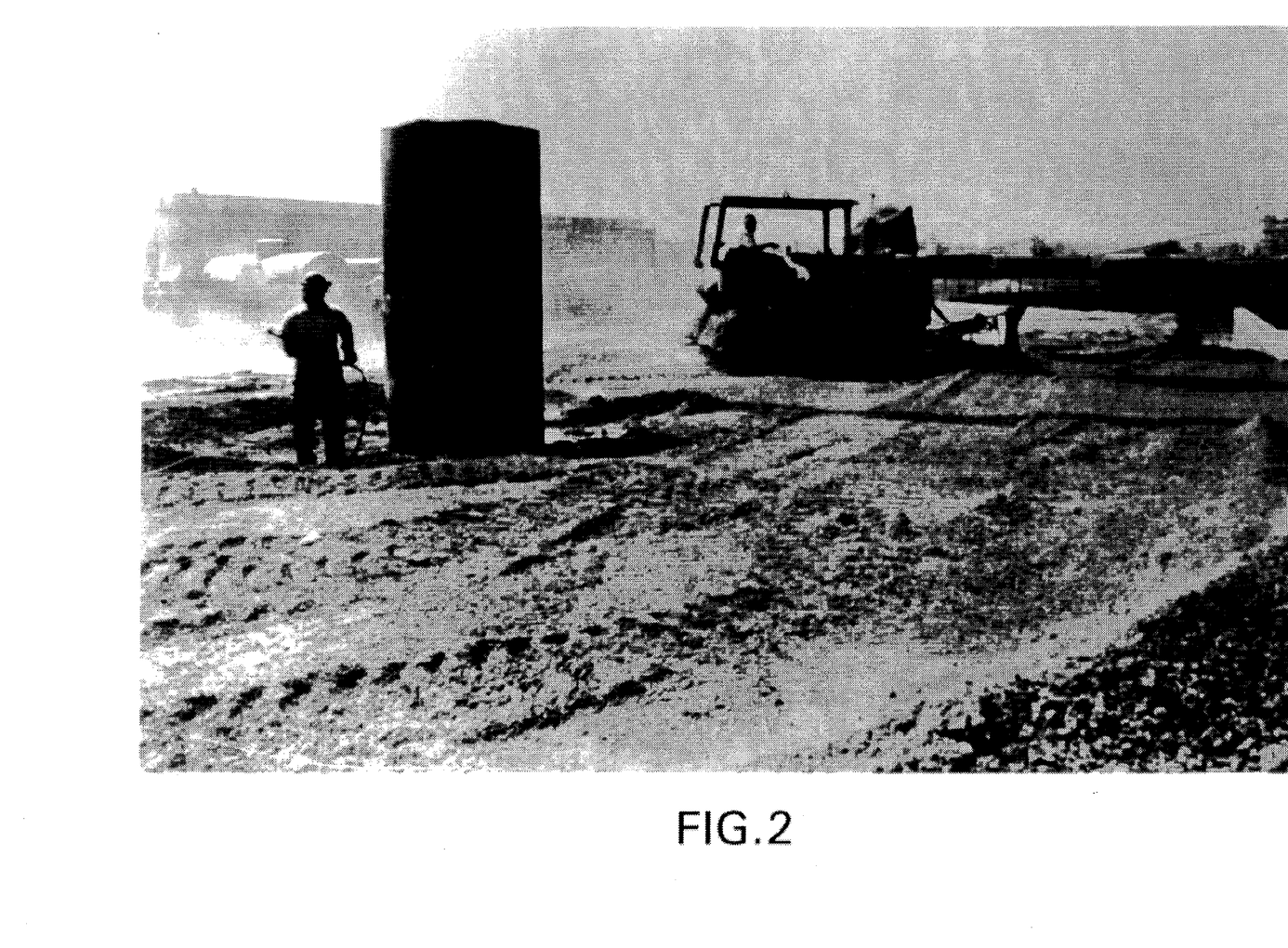
FIG. 2 is a photograph showing material in the settling pond being buried.

The quantity of phosphorus sludge deposited in the settling pond (FIG. 1) increased rapidly when phosphorus was being washed. The pond was not lined with an impervious membrane and leakages caused fishkills. In 1980 about half of the 14-acre settling pond was filled in with ash and phosphate ore as shown in FIG. 2. The quantity of elemental phosphorus buried in the pond is not known with accuracy. It is assumed about 3 percent of the elemental phosphorus produced was lost in the phosphorus sludge. Since about 1.1 million tons of elemental phosphorus was produced, elemental phosphorus in sludge will be as follows:

$$\frac{1.1}{0.97} \times 0.03 = \text{about 34,000 tons.}$$

However, the quantity may be greater than 34,000 tons.

Figure 3:
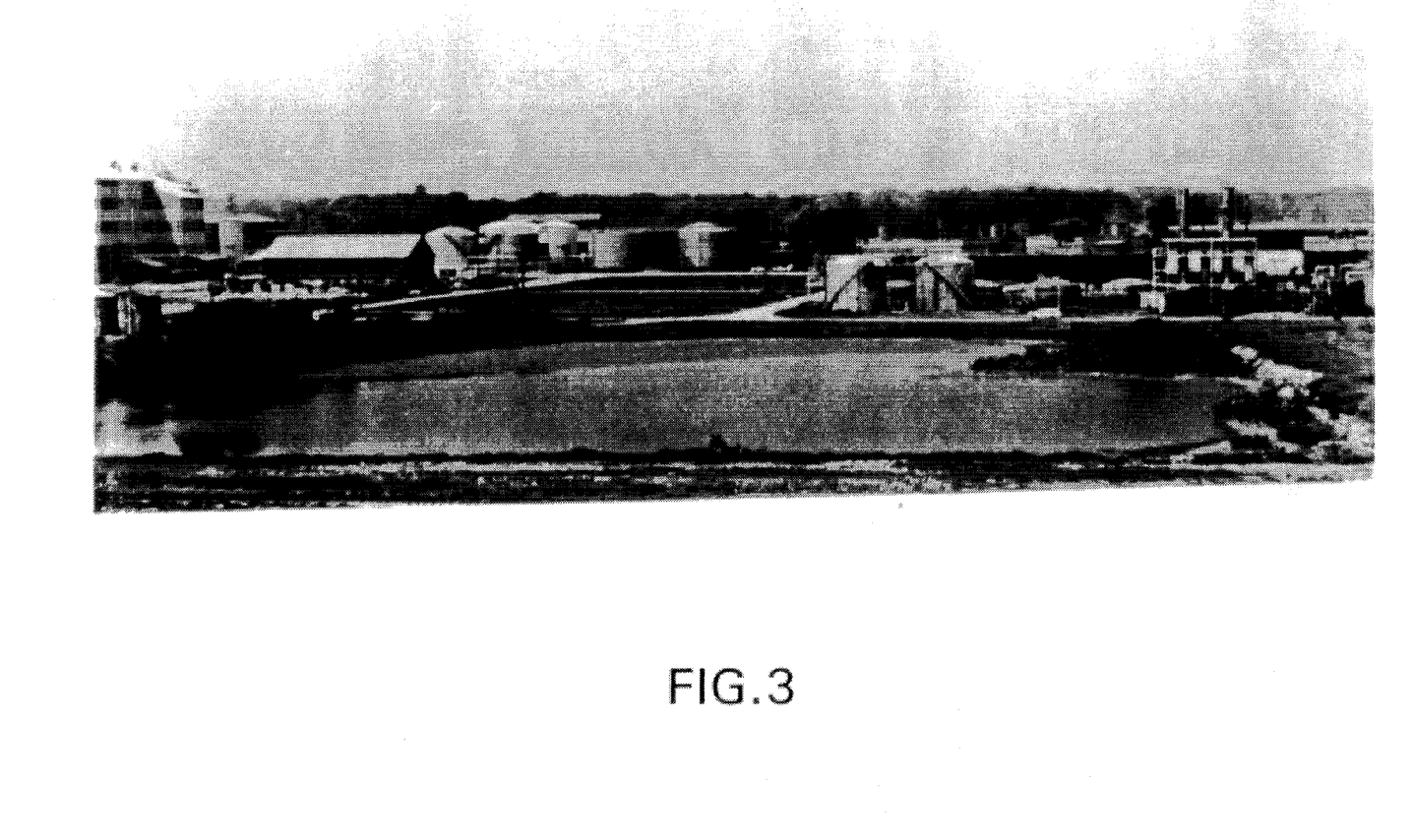

FIG. 3 shows the part of the settling pond that was not filled in. The liquid in the unfilled-in part of the pond is phossy water containing dissolved elemental phosphorus, colloidal phosphorus particles, and possibly some settleable phosphorus particles.

The original volume of the 14-acre settling pond was 2,300,000 cubic feet as reported in "Waste Effluent; Treatment and Reuse," *Chemical Engineering Progress*, volume 65, June 1969. Under the assumption that half the pond was unfilled-in, the volume of phossy water is estimated to be 1,150,000 cubic feet.

Precipitator dust was generated at NFERC at a rate of 0.06 ton (dry basis) per ton elemental phosphorus produced. Since over 1.1 million tons of phosphorus was produced at NFERC, simple calculations indicate about 68,000 tons of precipitator dust was generated. However, precipitators were installed about four years after production of elemental phosphorus was undertaken. Some precipitator dust was distributed as a fertilizer during World War II. Too, small particles comprising precipitator dust adsorb water in outside storage and this increases the quantity. Taking these factors into consideration, it was estimated about 34,000 tons of precipitator dust (wet basis) is stored at NFERC.

When precipitator dust was collected the average elemental phosphorus content was about 0.3 percent. But the elemental phosphorus content may be as high as 2.1 percent.

Processes have been invented to recover phosphorus sludge by a combination of distillation and recycle. The phosphorus sludge is distilled to recover most of the elemental phosphorus. Phossy water will be generated when the phosphorus is condensed. In accordance with U.S. Pat. No. 4,608,241, residue from distillation may be agglomerated by tumbling with a binder formed by reacting acidic phosphorus compounds with alkaline substances to prepare feedstock for phosphorus furnaces. When the feedstock is smelted, elemental phosphorus is produced.

U.S. Pat. No. 4,968,499 discloses a process for converting precipitator dust into phosphorus furnace feedstock whereby the waste is agglomerated by a process similar to that used to agglomerate residue from distillation of phosphorus sludge. Elemental phosphorus present in the precipitator dust will be vaporized when agglomerates are dried. Scrubbing the gas with water for pollution abatement will condense the phosphorus and this will generate phossy water.

Processes were invented to recover phossy water generated during condensation of elemental phosphorus as disclosed in U.S. Pat. Nos. 4,383,847; 4,451,277; and 4,537,615. Phossy water is used instead of process water to manufacture fluid fertilizers.

A process is needed to dispose of the large volume of phossy water shown in FIG. 3. The quantity is too much for recovery in fluid fertilizers as disclosed in U.S. Pat. Nos. 4,383,847; 4,451,277; and 4,537,615. Since the elemental phosphorus content is largely limited to dissolved phosphorus and colloidal phosphorus, evaporation to dryness appeared to be the preferred disposal method. And a suitable source of heat energy is needed to evaporate the phossy water.

Phossy water generated when phosphorus is condensed contains dissolved phosphorus, colloidal phosphorus particles, and settleable phosphorus particles. Although phossy water may be clarified to remove settleable phosphorus particles, industrial clarification processes do not remove all suspended particles. Phosphoric acid accumulates in water recirculated at phosphorus condensers, and the phosphoric acid is neutralized with ammonia forming ammonium phosphate. Thus phossy water bled off from the recirculating stream of condenser water contains the nutrients, nitrogen and $P_2P_5$. The nutrients are recovered when the phossy water is added to fluid fertilizers as described in U.S. Pat. Nos. 4,383,847; 4,451,277; and 4,537,615.

Phossy water from phosphorus condensing contains ammonium fluosilicate, potassium fluosilicate, and sodium fluosilicate. Although the concentration of the various salts, including ammonium phosphate, can be increased by recirculating condenser water, fluosilicate salts precipitate as scales on heat transfer surfaces, in pumps, and in piping. Thus the concentration of the salts has to be limited to prevent precipitation of fluosilicates. A phosphorus condensing system is needed which will permit salts in the recirculating condenser water to be concentrated.

SUMMARY AND OBJECTS OF THE INVENTION

When TVA undertook production of elemental phosphorus in 1934 the process was incompletely developed. The agency proceeded to complete the development and simultaneously produce the chemical on a large-scale basis. Much innovative technology was developed and demonstrated at NFERC. The NFERC became the center for technology on production of elemental phosphorus.

Wastes which contained elemental phosphorus were generated at NFERC at the beginning of the large-scale operation. However, it was not known that elemental phosphorus was so toxic and the primary concern was to obtain sustained operation of the production facilities. During World War II elemental phosphorus produced at NFERC was used as a munition, and meeting production schedules became even more important. Work on recovery of wastes was not of primary importance during the wartime emergency.

After World War II the program at NFERC shifted back to production of elemental phosphorus for use in the development of new and improved fertilizers. Losses of elemental phosphorus in wastes was of greater concern because of the need to achieve high recoveries. Although toxicity of elemental phosphorus became evident, treatment of elemental phosphorus-containing wastes had to be economically justified on the basis of improved efficiency. The discharge of phossy water into surface streams was considered acceptable after settleable phosphorus particles were removed by clarification in a large settling pond such as the one shown in FIG. 1.

In the late 1950s and 1960s environmental regulations began to emerge. At NFERC, innovative processes were provided to decrease emissions of pollutants in air and decrease discharges of pollutants into surface streams.

Phossy water generated during the condensation of elemental phosphorus was clarified to remove most of the suspended sludge, and the clarified phossy water was recycled to the condensing system. Insoluble fluorine compounds accumulated in the recycled phossy water and it was necessary to bleed off a stream of the clarified phossy water and replace it with process water to prevent precipitation of fluorine compounds. The bled phossy water was diluted with cooling water and further clarified in the settling pond. With this improvement the average elemental phosphorus content of phossy water was reduced and the rate of deposition of phosphorus sludge in the settling pond was lessened.

The Fisheries Research Board of Canada reported in the 1970s that some species of marine life are killed by concentrations of elemental phosphorus as low as a few parts per billion. Effluent from the settling pond had little or no settleable particles of elemental phosphorus. Nevertheless, the normal elemental phosphorus content was about 90 parts per billion, and the concentration was significantly greater than this when the pond became more heavily loaded with suspended particles. The effluent obviously was too toxic to be released to surface streams.

Research and development on the process for producing elemental phosphorus was being phased out in the 1970s. There was little incentive to work on processes for correcting the phossy water problem and when production was discontinued in 1976, discharge of the waste was an uncorrected environmental problem.

A program of investigation was undertaken by James C. Barber and Associates, Inc. to devise practical means of utilizing phossy water that remained at NFERC. Results of research and development at NFERC on elemental phosphorus production and on fertilizers provided a basis for inventions to utilize phossy water from an operating plant. However, phossy water in the settling pond shown in FIG. 3 has little potential for utility.

The primary objects of the present invention, therefore, are as follows.

1. To provide a process for the disposal of phossy water when the phossy water contains little or no settleable particles of elemental phosphorus.
2. To provide a process for the recovery of phossy water when the phossy water contains dissolved elemental phosphorus, colloidal particles of elemental phosphorus, and settleable particles of elemental phosphorus.

BRIEF DESCRIPTION OF DRAWINGS

FIG. 3 is a photograph of the part of the settling pond that was not filled in.

DETAILED DESCRIPTION OF INVENTION

FIG. 1 is an aerial photograph of a 14-acre settling pond that was formerly used as a depository for phosphorus sludge. Phossy water continuously discharged through a weir into a ditch and the ditch discharged into a stream called Pond Creek. Pond Creek discharged into the Tennessee River. While phossy water was being discharged from the settling pond, Pond Creek would not sustain marine life.

The settling pond shown in FIG. 1 was constructed in 1936 soon after production of elemental phosphorus was started at NFERC. At this time lining of the pond with a sheet of plastic was not practiced because plastic sheets were not available. Much of the pond was filled in by phosphorus sludge, particularly during wartime emergencies when elemental phosphorus was being washed to make munitions. In 1976 when production of elemental phosphorus was discontinued the pond area was estimated to be 10 acres.

In 1980 part of the settling pond shown in FIG. 1 was filled in with ash and phosphate ore. FIG. 2 is a photograph showing material in the settling pond being buried.

FIG. 3 is a photograph of the part of the settling pond that was not filled in. Liquid shown in FIG. 3 is phossy water. From examination of FIGS. 1 and 3 it appears about half of the settling pond was filled in. The volume of phossy water was estimated to be 1,150,000 cubic feet. As analysis of the phossy water is not available, but phossy water discharging from the settling pond had an average elemental phosphorus content of about 0.09 part per million. After extended settling in the pond, elemental phosphorus will be present primarily as dissolved phosphorus and colloidal particles.

Figure 4:
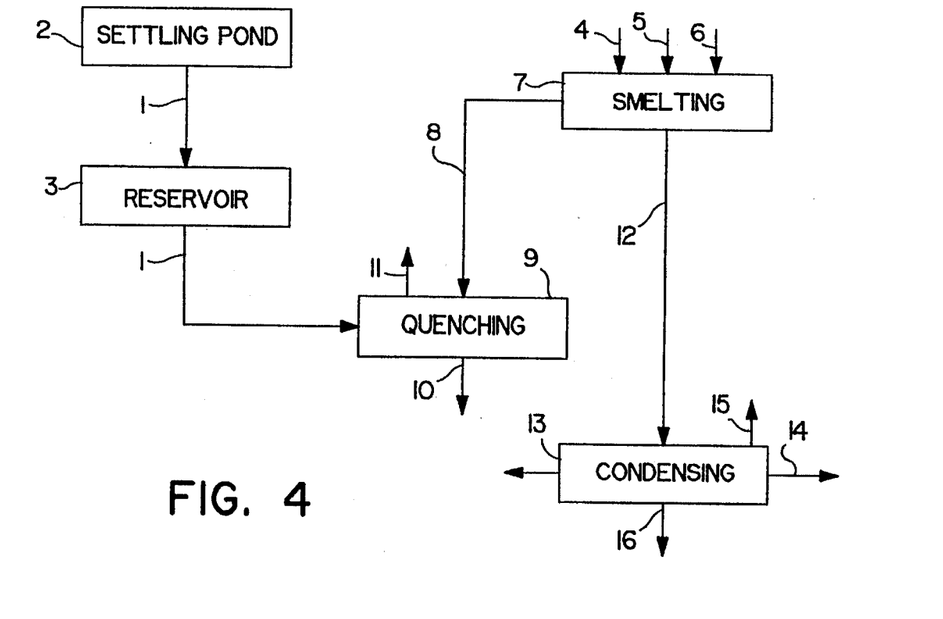
FIG. 4 is a diagram to show how phossy water can be disposed of by utilizing waste energy generated during the production of elemental phosphorus.

FIG. 4 is a diagram to show how phossy water can be disposed of by utilizing waste energy generated during the production of elemental phosphorus. Phossy water 1 is transported from settling pond 2, such as the settling pond shown in FIG. 3, to reservoir 3 located near a phosphorus production facility.

Silica 4, phosphorus-containing solid 5, and reducing carbon 6 are smelted in electric furnace 7. Molten slag 8 flows from electric furnace 7 to quenching 9. Molten slag is quenched with phossy water 1 to form granulated slag 10. Phossy water 1 is vaporized by contact with molten slag to form steam 11.

Furnace gas 12, consisting mainly of carbon monoxide, phosphorus vapor and hydrogen, flows to condenser 13 wherein gas is cooled and elemental phosphorus condenses. Phosphorus sludge 14 is transported to a facility to separate elemental phosphorus from the impurities. This facility is not shown in FIG. 4.

Noncondensable gas 15 consisting of carbon monoxide and hydrogen is byproduct which can be used as a fuel. Elemental phosphorus 16 is the product.

Figure 5:
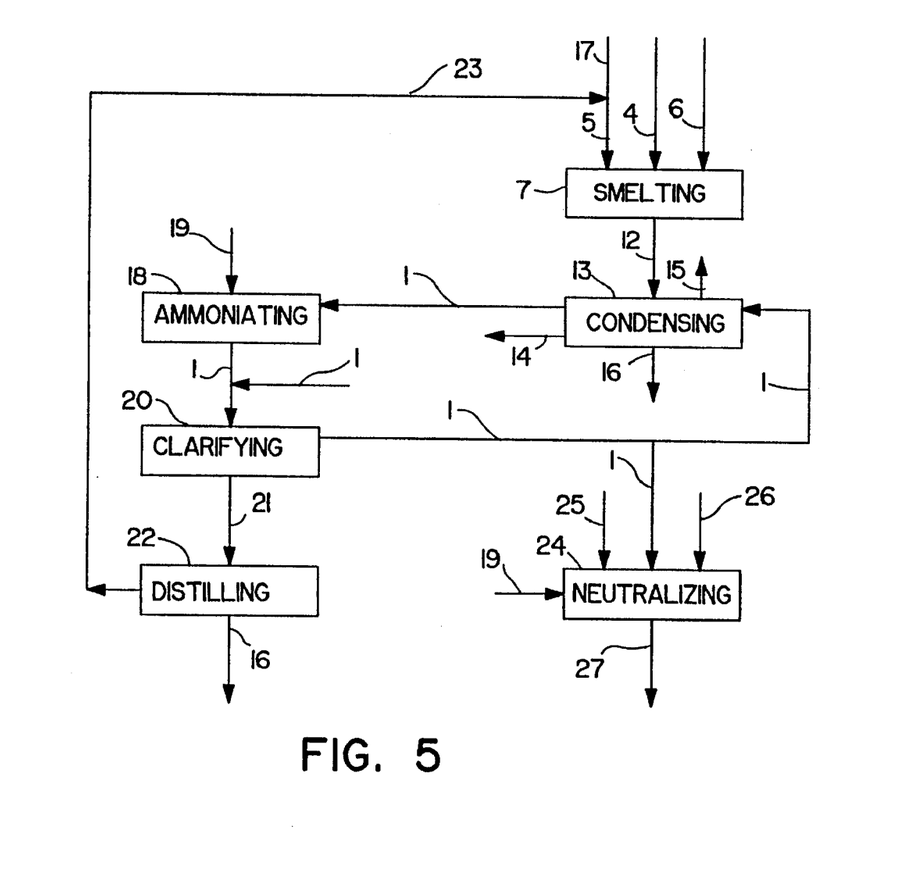
FIG. 5 is a block diagram illustrating the process for the recovery of phossy water in fluid fertilizers.

FIG. 5 is a block diagram illustrating the process for the recovery of phossy water in fluid fertilizers. Phosphate ore 17 and residue 23 from distillation of underflow 21 comprise phosphorus-containing solids 5. Phosphorus-containing solids 5, silica 4, and reducing carbon 6 are smelted in electric furnace 7. Furnace gas 12 flows to condenser 13 where gases are cooled by recirculating phossy water. Recirculating equipment is not shown in FIG. 5. Noncondensable gas 15 consisting of carbon monoxide and hydrogen is a byproduct which can be used as a fuel. Phosphorus sludge 14 is transported to a facility to separate elemental phosphorus from the impurities. This facility is not shown in FIG. 5. Elemental phosphorus 16 is the product from smelting phosphorus-containing solids.

A stream of phossy water 1 is bled from recirculating equipment at condenser 13 and is transported to ammoniator 18. Ammonia 19 is added to ammoniator 18 to increase pH of phossy water 1 to the range of 8.5 to 9.0. Fluosilicate salts are converted to fluoride salts with precipitation of silica in accordance with the following equation.

$(NH_4)_2SiF_6 + 4NH_3 + 2H_2O = 6NH_4F + SiO_2$.

Phossy water 1 from condenser 13 contains ammonium fluosilicate, sodium fluosilicate, and potassium fluosilicate. Sodium and potassium fluosilicates are derived from volatilization of sodium and potassium compounds from electric furnace 7. These alkali metal compounds react with fluosilicic acid to form fluosilicate salts, which then react with ammonia to form alkali metal fluorides and ammonium fluoride by reactions similar to that shown above. Silica is precipitated when fluosilicate salts are ammoniated.

Precipitator dust that has accumulated at NFERC is converted into phosphorus furnace feedstock in accordance with U.S. Pat. No. 4,968,499. The precipitator dust is agglomerated and the agglomerates are indurated in the temperature range of 220 to 1832 degrees F. The facility to convert precipitator dust into phosphorus furnace feedstock is not shown in FIG. 5. Phossy water is generated when gases from the indurator are scrubbed with water. The phossy water generated is mixed with ammoniated phossy water 1 from ammoniator 18.

The mixture of phossy water flows to clarifier 20. Overflow from clarifier 20 is clarified phossy water 1. Underflow 21 from clarifier 20 flows to still 22. Underflow 21 is distilled to obtain elemental phosphorus 16 and residue 23. Residue 23 is smelted in electric furnace 7.

Phossy water 1 from clarifier 20 is added to recirculating phossy water at condenser 13. Noncondensable gases 15 are comprised primarily of carbon monoxide and hydrogen and they are used as a fuel.

A stream of phossy water 1 is bled off and added to neutralizer 24. Ammonia 19, phosphoric acid 25, and suspending clay 26 are added to neutralizer 24 to make fluid fertilizer 27.

Figure 6:
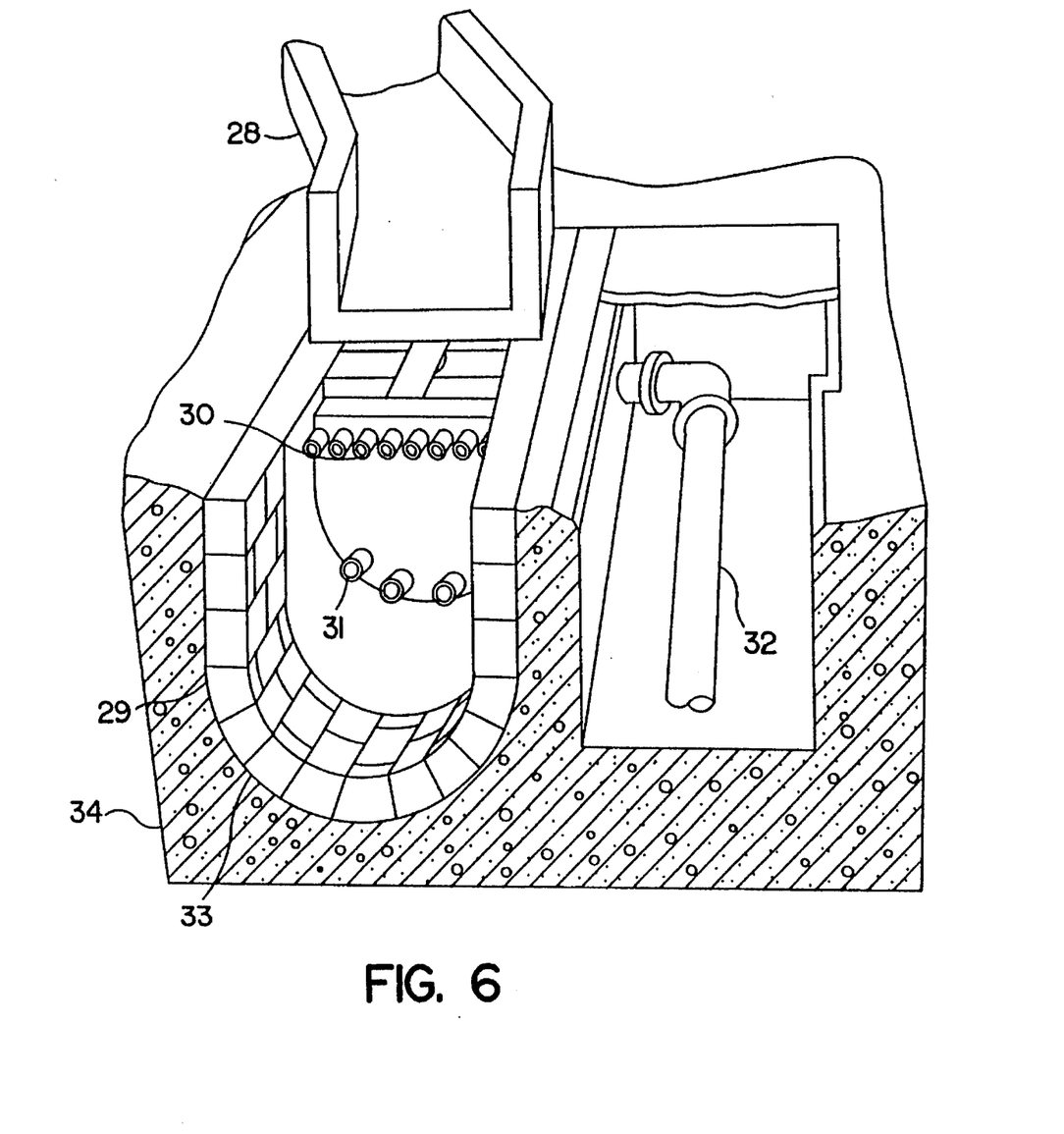
FIG. 6 is a diagram of equipment used to quench the slag at NFERC.

FIG. 6 is a diagram of equipment used to quench the slag at NFERC. Molten slag 8 was tapped from electric furnace 7 into slag runner 28. Molten slag 8 flowed into sluiceway 29. As molten slag 8 dropped into sluiceway 29 it was contacted by water discharging from a battery of granulating nozzles 30. Molten slag 8 was solidified and simultaneously granulated by the jets of high-velocity water. Three batteries of transporting nozzles 31 sluiced the resulting slurry of granulated slag and water to a pit where water was separated from the solid. Water was recycled to granulate and transport slurry of slag and water to the slag pit. The slag pit is not shown in FIG. 6. Sluiceway 29 was 110 feet long.

Four centrifugal pumps, each having a rated capacity of 800 gallons per minute at 300-foot head, supplied water for the nozzles. The pumps are not shown in FIG. 6. Water was supplied through 8-inch water supply pipe 32.

Sluiceway 29 was lined with brick 33 set in concrete 34. Red shale brick were used to line the sluiceway. The concrete was reinforced.

PRIOR ART

U.S. Pat. No. 4,383847 is a process for the production of fluid fertilizer. The following patents were cited as prior art, and these patents are referred to as prior art for the present patent application.

1. U.S. Pat. No. 2,040,081, Harry A. Curtis, Mar. 12, 1936.
2. U.S. Pat. No. 2,741,545, F. T. Nielsson, Apr. 10, 1956.
3. U.S. Pat. No. 3,012,874, A. B. Phillips, et al., Dec. 12, 1961.
4. U.S. Pat. No. 3,034,883, T. P. Hignett, et al., May 15, 1962.
5. U.S. Pat. No. 3,113,858, A. V. Slack, et al., Dec. 10, 1963.
6. U.S. Pat. No. 3,177,062, T. P. Hignett, et al., Apr. 6, 1965.
7. U.S. Pat. No. 3,202,744, J. C. Barber, et al., Aug. 24, 1965.
8. U.S. Pat. No. 3,335,094, W. J. Darby, Aug. 8, 1967.
9. U.S. Pat. No. 3,464,809, G. C. Hicks, Sep. 2, 1969.
10. U.S. Pat. No. 3,813,233, L. A. Kendrick, Jr., May 28, 1974.

U.S. Pat. No. 4,451,277 discloses another process for the production of fluid fertilizer. The following publications and patents were cited as prior art, and this prior art is referred to herein.

1. Chemical Engineering Progress, Vol. 65, No. 6, June 1969, "Waste Effluent; Treatment and Reuse," J. C. Barber.
2. U.S. Pat. No. 2,039,297, H. A. Curtis, May 5, 1936.
3. U.S. Pat. No. 2,135,486, L. H. Almond, Nov. 8, 1938.
4. U.S. Pat. No. 3,084,029, J. C. Barber, G. H. Megar, and T. S. Sloan, Apr. 2, 1963.
5. U.S. Pat. No. 3,113,839, J. C. Barber, G. H. Megar, and T. S. Sloan, Dec. 10, 1963.
6. U.S. Pat. No. 3,136,604, J. C. Barber, G. H. Megar, and T. S. Sloan, Jun. 9, 1964.
7. U.S. Pat. No. 3,428,430, G. H. Megar and Arnett Hendrix, Feb. 18, 1969.
8. U.S. Pat. No. 3,531,250, Arnulf Hinz, et al., Sep. 29, 1970.
9. U.S. Pat. No. 3,433,601, H. M. Stevens, Mar. 18, 1969.
10. U.S. Pat. No. 3,615,218, L. B. Post, R. E. Paul, and W. R. Crudup, Oct. 26, 1971.
11. U.S. Pat. No. 4,081,333, W. S. Holmes, E. J. Lowe, and E. R. Brazier, Mar. 28, 1978.
12. U.S. Pat. No. 3,684,461, Fritz Muller, Karl-Heinz Stendback, and Horst-Heinrich Weizenkorn, Aug. 15, 1972.
13. U.S. Pat. No. 3,436,184, J. A. Hinkebein, Apr. 1, 1969.
14. U.S. Pat. No. 3,515,515, J. A. Hinkebein, Jun. 2, 1979.
15. U.S. Pat. No. 3,743,700, C. P. Orr, Jul. 3, 1973.
16. U.S. Pat. No. 3,852,050, Chao Hsiao and L. B. Horton, Dec. 3, 1974.
17. Proceedings of the 35th Industrial Waste Conference, Purdue University, May 13, 14, and 15, 1980, "Development of a Wastewater Management System for an Elemental Phosphorus Production Plant," John H. Koon, Gary M. Davis, Paul D. Knowlson, and Edward F. Smith.

A further literature search was undertaken for prior art reported over the period 1980 to present. The Chemical Abstracts Search Service was requested to search the literature for accumulations, utilization, and disposal of water containing elemental phosphorus. Although a computer search of the literature identified 90 references, 16 references reported prior art relating to the subject of the present application. The 16 references and abstracts are given below.

1. "Development of a Wastewater Management Systems for an Elemental Phosphorus Production Plant," John H. Koon, Gary M. Davis, Paul D. Knowlson, and Edward F. Smith, Proceedings of the Industrial Waste Conference, volume date 1980, 35, 550–9, publication year 1981. A pilot plant system of chemical precipitation, granular media filtration, and activated carbon adsorption was effective in removing phosphorus and in reducing $F^-$ and $PO_4^{\equiv}$ concentrations in phosphorus and phosphoric acid manufacture wastewater.

2. "Removing Elemental Phosphorus from Wastewaters," Clark Bennett and Theodore T. Garrett, German patent 3,046,898, Sep. 3, 1981. An aeration stage, following the precipitation of $(PO_4)^{\equiv}$ from phosphorus production wastewaters, and prior to sedimentation and filtration, reduced phosphorus to nondetectable levels, whereas post-treatment with activated carbon left traces of phosphorus in the effluent. Thus precipitation with CaO and aeration for 45 minutes with an air:water volume ratio of 2, minimum, reduced phosphorus levels from 244 parts per billion to nondetectable.

3. "Treatment of Wastewaters Containing Phosphorus," Herbert Diskowski, Johannes Krause, and Dietrich Mandelkow, European patent 49,762, Apr. 21, 1982. The treatment of wastewater from electrothermal production of phosphorus includes centrifugal filtration of the wastewater at>46° and pH 0.5–4.0, the separation of the filtrate into yellow phosphorus and water layers in a settling tank for 10–60 minutes, oxidationoof the supernatant from the settling tank, and neutralization of the phosphorus-free wastewater. Thus the wastewater at 55° and pH2–3 is filtered and the filtrate containing 290 mg. phosphorus per liter is allowed to stand in the settling tank for 30 minutes. A bleaching liquor 200 liters containing 14 percent NaOCl is added to 50 cubic meters of the supernatant containing 25 micrograms of phosphorus per liter resulting in water with phosphorus content<1 milogram per liter.

4. "Purification of Water Containing Phosphorus," Doris Gisbier, Dietman Zobel, Herbert Soyka, Heinz Rathmann, and Renate Rust, East German patent 153,803, Feb. 3, 1982. Elemental yellow phosphorus is removed from phosphorus storage and rinsing wastewaters by treatment with alkaline wastewaters from production of $K_4Fe(CN)_6$. Thus, a wastewater at pH 5.6 containing elemental phosphorus 40 and $P_2O_5$ (after oxidation) 307 milograms per liter was mixed with ferrocyanide-production wastewater at pH 11.7 containing CN-45 milograms per liter and filterable solids 105 grams per liter in a 1:1 ratio at 38°, which after settling produced an effluent of pH 11.5 containing $P_2O_5$ (after oxidation) 0.0021 percent. No $PH_3$ or $P_2O_5$ fumes were formed.

5. "Energy Conservation and Pollution Abatement at Phosphorus Furnaces," James C. Barber, U.S. Pat. No. 4,372,929, Feb. 8, 1983. Coke fines are blended with acidic waste material from phosphorus electrothermal manufacture to be agglomerated to form particles for use in a phosphorus furnace. Flotation tailings from phosphate rock beneficiation (mainly quartz) and a phosphate concentrate are agglomerated to prepare a self-fluxing furnace charge. Phosphate and coke fines are agglomerated to give particles with matched sizes to increase the output of the phosphorus furnace. The bleedoff water from condensing gaseous phosphorus from the furnace is used as feedstock for making suspension fertilizers. The sludge acid that separates from post-precipitation of impurities in wet-process $H_3PO_4$ is used as a binder in preparing agglomerates. The apparatuses are described for agglomerating coke and phosphate and for measuring the abrasion and shatter resistance of the agglomerates.

6. "Recovery of Phosphorus from Sludge," George James Morgan, European patent 98,038, Jan. 11, 1984. Elemental phosphorus is recovered from the sludge formed during the production of phosphorus by smelting of phosphate rock. The water from the sludge is removed by evaporation using a heat-transfer medium and the phosphorus values are separated from the solid impurities contained in the sludge by known techniques such as centrifuging, filtering, settling, etc. Heated phosphorus is utilized as the direct heat-transfer fluid in the process, which eliminates the fouling and scaling problems associated with indirect heat-transfer means.

7. "Fluid Fertilizer from a Phosphorus Furnace Waste Stream," James C. Barber, U.S. Pat. No. 4,451,277, May 29, 1984. Fluid fertilizer is produced by adding wastewater from a phosphorus smelting furnace to the first-stage ammoniator in an orthophosphate suspension fertilizer process. Phosphate ore, reducing carbon, and silica rock are smelted, and the phosphorus-containing gas evolved is treated to remove suspended dust, then cooled in an adiabatic condenser wherein water is (1) sprayed into the condenser to condense phosphorus from the gas, (2) collected in a sump, and (3) recirculated to the condenser. Alkaline material (to maintain a pH of 5.5 to 6.0) and fresh water are added to the recirculating stream, and water is bled off from this stream and clarified for use in fertilizer manufacture. A process is disclosed also for production of $H_3PO_4$ of high purity, suitable as animal feed. The technology provides environmentally acceptable disposal means for aqueous wastes containing elemental phosphorus, at a favorable cost. Thus, a mixture of rock phosphate, silica rock, and coke was smelted, the furnace gas was treated in an electrostatic precipitator, and the gas was cooled in an adiabatic condenser. A water-cooled coil was inserted in the condenser sump, and makeup water was added. The condenser water was neutralized with soda ash (~438 pounds per ton of phosphorus produced). Water (containing ~0.2% $P_2O_5$) was bled off at 6500 pounds per ton phosphorus produced, and suspension fertilizer was produced at 37,100 pounds per ton of elemental phosphorus produced.

8. "Treatment of Phosphorus-Containing Waste Material," David L Dodson, Bruce D. Pate, Phillip C. Rogers, U.S. Pat. No. 4,481,176, Nov. 6, 1984. Elemental phosphorus values are recovered from phosphorus-containing waste materials. The size of the solid particulate materials of the sludge is decreased and a uniform homogenous sludge is formed which is filtered through a high-pressure thin-cake filter resulting in a filtrate high in phosphorus values. A pump retrieval means is described for retrieving the sludge from contaminated disposal areas. A preconditioning dewatering means for thickening and clarifying the sludge prior to comminuting the solids and filtering to recover the phosphorus values are discussed.

9. "Production of Phosphorus and Phosphoric Acid," James C. Barber, U.S. Pat. No. 4,608,241, Aug. 26, 1986. A multistep process for treating phosphorus-containing waste, for example, from $H_3PO_4$ plants, is described. The steps include: (1) distilling the waste to separate phosphorus and water, which are condensed and separated into condensable and non-condensable gases; (2) agglomerating the residue with a binder and smelting the agglomerate in a submerged-arc furnace; (3) combining and burning the phosphorus from steps 1 and 2 to give $P_2P_5$; and (4) treating the $P_2O_5$ with water to give aqueous $H_3PO_4$. Processes are also discussed for separating elemental phosphorus from the waste, converting the residue to granular fertilizer, and making suspension fertilizer from the water containing the phosphorus. Apparatus for the process is described in detail with diagram and flow charts.

10. "Phosphorus Recovery from Phosphorus-Containing Pond Sludge," Steven M. Beck and Edward H. Cook, Jr., U.S. Pat. No. 4,717,558, Jan. 5, 1988. The title process, for phosphorus recovery from sludge containing 5–70% phosphorus, consists of mixing the sludge with additional water and heating with mild agitation at 165°–212° F. for 30 minutes or more to increase the phosphorus concentration in the sludge without compositional layering. The concentrated sludge settles, and is washed with water at 130°–150° F., the steps are repeated, and the sludge is recovered. Sludge 595 grams, containing phosphorus 21.9%, dirt 19.2%, and water 48.9% was treated with additional water 1200 grams and heated at 169° F. with mild agitation for about 90 minutes, after which the sludge was allowed to settle and give a bottom layer containing phosphorus 84.4, dirt 3.3, and water 12.3%. The sludge was sparged with hot (135° F.) water at 2 liters per hour with continuous overflow to give, after 2 hours, 160 grams of material of composition phosphorus 79.4%, dirt 1.8%, and water 18.8%, for example, about 97.5% phosphorus recovery.

11. "Process for Treatment of Phossy Water for Recycling," Gordon H. Scherbel, David A. Crea, Jerry A. Keely, Ronald L. Andersen, and Byron L. Nichols, U.S. Pat. No. 4,744,971, May 17, 1988. In the electric furnace production of elemental phosphorus, cold phossy water (water contaminated with dirt and phosphorus) used for cooling and washing is segregated from hot phossy water used in condensing and handling liquid phosphorus. The cold phossy water is clarified, especially in a lined pond, and then recycled to the process. The hot phossy water is flocculated and clarified in a lamellar settler, and then recycled. Phosphorus in the sludge underflow from the settler is separated form the solids and recovered. Phosphorus at 145 pounds per day was recovered from a settler underflow in the clarification of hot phossy water containing 306 ppm of phosphorus received at a rate of 40 gallons per minute.

12. "Phosphorus Recovery from Phosphorus Mud," Michael A. Nield and Basil N. Robbins, Canadian patent 1,267,267, Apr. 3, 1990. The title process comprises (a) completely boiling off the water from the waste material, (b) boiling off yellow phosphorus from the waste material, and (c) boiling of residual phosphorus from the treated waste material. An inert gas, for example, nitrogen, is blown through the waste material during stages a and b, and an oxygen-containing gas, for example air, is used in stage c to burn off the residual phosphorus. This method decreases the time required to process phosphorus mud to a safety disposable form.

13. "Passivation of elemental phosphorus contained in waste ponds," Auston K. Roberts, William E. Trainer, Mark L. Blumenfield, David L. Biederman, U.S. Pat. No. 4,961,912, Oct. 9, 1990. Elemental phosphorus-containing wastes in waste ponds are mixed with oxygen, or with an oxygen-nitrogen mixture, or air, and passivated to a substantially less pyrophoric material, which can be recovered as an aqueous phosphate solution.

14. "Oxidation of Elemental Phosphorus in Water Under the Effected of Ionizing Radiation," N. P. Tarasova and Yu V. Balitskii, Zh. Prik. Khim (Leningrad), 64(6), 1172–7. The feasibility is shown of reagent-free oxidation of elemental phosphorus in wastewater by exposure to ionizing radiation (60 Co was used in the study). The process has a radical mechanism and proceeds through a number of intermediate stages.

15. "Treatment of Wastewaters Containing Phosphorus," A. F. Gafarova, O. I. Grebenikov, G. V. Nad'yarnykh, N. P. Tavasova and V. N. Chistyakov, Russian patent 1,650,612, May 23, 1991. The process includes bubbling an oxygen-containing gaseous mixture at elevated temperatures in the raw slurry. White phosphorus is extracted and the purification degree of the phosphorus-containing wastewaters is increased when the bubbling is performed simultaneously with γ irradiation at a 0.5–1.7 kilogram range of absorbed dosage (A), followed by separating phosphorus after stratifying the slurry and irradiating the remaining aqueous phase at $$A = \frac{\ln C}{0.8 + \frac{t}{30}} + 1$$

(C=concentration of white phosphorus in the system, miligrams per liter; t=temperature ° C.) for initial phosphorus concentration of 4–150 miligrams per liter, and $$A = \left(0.375 - \frac{0.05t}{20}\right)$$

C for initial phosphorus concentration of equal to or less than 4 miligrams per liter and 30°–70°.

16. "Recovery and Removal of Elemental Phosphorus from Electric Furnace Sludge," I. J. Anazia, J. Jung, and J. Hanna, Miner. Metall. Process., 9(2), 64–8, 1992. Two samples (samples A and B) of phosphorus-containing sludges from electrothermal manufacture of elemental phosphorus were tested using physical separation techniques (sizing, froth flotation, and dispersed air oxidation) to recover elemental phosphorus as a concentrate and to render the residual material nonhazardous. Sample A was probably a mixture of phosphorus sludge, fly ash, and bottom ash, and sample B may have been neutralized with lime after deposition in the pond. In direct flotation of elemental phosphorus from sample-A sludge, the selectivity was achieved with minimum quantities of kerosine as the elemental phosphorus collector, whereas with sample B, xylene was a better collector. Flotation and sizing produced concentrations containing 69–90% elemental phosphorus with recovery 60–87%. Newly developed dispersed air oxidation of fines and tailings was effective in the removal of additional 10–15% elemental phosphorus from the sludge.

EXAMPLE I

Molten slag from electric furnaces operated at NFERC was quenched with water to granulate the material. A technical paper titled "Handling and Utilization of Phosphorus Furnace Slag," J. C. Barber and M. M. Striplin, Jr., was presented at the Electric Furnace Conference of the American Institute of Mining, Metallurgical, and Petroleum Engineers, November 1960, in Chicago, Ill. The technical paper was published in the conference proceedings.

The paper "Handling and Utilization of Phosphorus Furnace Slag" includes diagrams of the equipment of quench molten slag and the paper gives data on the performance of the quenching operation. Information in the present example was derived from the paper.

Data on performance of the quenching operation were obtained when the phosphate smelted was a mixture or ores mined in Tennessee and Florida. Fifty-eight percent of the ore was from Tennessee deposits and 42 percent was from Florida deposits. The Tennessee phosphate was agglomerated by nodulizing and Florida phosphate concentrate was added to nodulizing kilns as substrate. Uncalcined Florida pebble phosphate was fed to the electric furnaces without agglomeration. About 8.4 tons of molten slag was made per ton of elemental phosphorus produced. Typical composition of the slag is given in table 1.

TABLE I

Typical Composition of Phosphorus Furnace Slag

| Constituent | Percentage, dry basis |
|---|---|
| CaO | 46.0 |
| $SiO_2$ | 38.0 |
| $Al_2O_3$ | 9.2 |
| $P_2O_5$ | 1.2 |
| F | 2.8 |
| $K_2O$ | 1.2 |
| $Na_2O$ | 0.3 |
| $Fe_2O_3$ | 0.3 |
| MgO | 0.3 |
| S | 0.2 |
| MnO | 0.2 |
| $TiO_2$ | 0.1 |

In addition to the constituents shown, the slag was analyzed for zinc, copper, boron, molybdenum, lead, tin, and lithium. The percentage of each of these materials was less than 0.1. Most of the constituents in the slag was derived from the phosphate fed to the furnace; therefore, the composition of the slag will vary with the source of phosphate.

Normally, the slag was rapidly cooled by quenching with air or water and an amorphous, glassy material was formed. With slow cooling, calcium silicates crystallize. The specific density of the air-cooled slag was 180 pounds per cubic foot. The bulk density varied widely, depending on the method of cooling and the particle size.

Temperature of the molten slag was in the range of 2600° to 2700° F.

In order to make a slag tap, water was turned on the quenching and transporting nozzles and then the taphole was opened. A tapered steel plug was removed from the taphole and a hole was punched through the frozen slag with a steel bar. Sometimes it was necessary to melt out the frozen slag with an iron pipe ignited with oxygen, but this procedure was used only when necessary because of the high cost and the possibility of damaging the water-cooled tapping assembly. The taphole was closed by reinserting the steel plug.

EXAMPLE II

Example I describes conditions under which molten slag was quenched at NFERC. Example II gives performance data on the operation of the slag quenching facility. The data are given below.

TABLE 2

Operating Data for Quenching Molten Slag

| Slag temperature, degrees F. | |
|---|---|
| At taphole | 2660 |
| Entering sluiceway | 2470 |
| Tapping rates, ton per minute | |
| Average | 0.4 |
| Maximum | 1.0 |
| Pressure of water at nozzles, psi | 125 |
| Water required, gallons per ton slag quenched | 2900 |
| Slag size, percentage through | |
| 10 mesh | 93 |
| 20 mesh | 69 |
| 48 mesh | 13 |
| Coat of slag tapping and water quenching, dollars per ton[a] | |
| Tapping | 1.07 |
| Water quenching | 0.07 |
| Transportation to storage pile | 0.47 |
| Total | 1.61 |

[a]Costs in November 1960 which was date paper "Handling and Utilization of Phosphorus Furnace Slag" was presented.

EXAMPLE III

It was stated above in "Summary and Objects of the Invention" that one of the two primary objects was:

To provide a process for the disposal of phossy water when the phossy water contains little or no settleable particles of elemental phosphorus.

FIG. 3 is a photograph of phossy water in a settling pond at NFERC. The volume of phossy water in the settling pond was estimated to be 1,150,000 cubic feet. The specific objective of the invention is to dispose of the large volume of phossy water shown in FIG. 3.

The present example will show how phossy water can be disposed of by utilizing waste heat in molten slag.

Data in table 2 show that the quantity of water required to quench and granulate molten slag was 2900 gallons per ton. However, some of the water was consumed when the granulated slag was slurried in order to pump it to a storage pile. Water used to slurry the slag was discharged as a waste. Granulated slag can be hauled to storage and discharge of a liquid waste can be avoided. Water needed to quench and granulate slag will be less than 2900 gallons per ton if no water is needed for slurrying.

The quantity of phossy water that will be evaporated from quenching slag made in a 50-megawatt furnace was calculated from the following conditions.

1. Electric energy required to produce one ton of elemental phosphorus was taken to be 12,500 kWh.
2. Operating time 90 percent of actual time.
3. Specific heat of slag 0.3
4. Slag made was 8.4 tons per ton of elemental phosphorus produced.
5. Temperature of slag at sluiceway 1470° F.
6. Assume slag is cooled to 100° F. by quenching.
7. Net enthalpy of steam of 100°0 F. is 1122 Btu per pound.

$$\frac{50,000 \times 24 \times 0.9 \times 8.4}{12,500} = 726 \text{ tons slag per day } 726 \times 2000 \times$$

$(2470 - 100) \times 0.3 = 1032 \times 10^6$ Btu per day.

$$\frac{1032 \times 10^6}{1122} = 919,786 \text{ pounds phossy water evaporated per day.}$$

$$\frac{919,786}{62.4} = 14,740 \text{ cubic feet phossy water evaporated per day.}$$

$$\frac{1,150,000}{14,740} = 78 \text{ days required to evaporate phossy water shown in FIG. 3.}$$

A 25-megawatt furnace would be expected to have an average operating time of 95 percent. Calculations similar to those made above show that 148 days would be required to evaporate phossy water shown in FIG. 3. From these calculations it was concluded that a 25-megawatt furnace, or larger, is needed to evaporate water shown in FIG. 3 in a reasonable time.

EXAMPLE IV

Elemental phosphorus commonly used in industry is $\propto$ white phosphorus. However, the color is observed to be yellow. The $\propto$ white phosphorus usually contains small percentages of yellow phosphorus oxides. The $\propto$ white phosphorus is obtained by the condensation of phosphorus vapor, and the elemental phosphorus in phosphorus sludge and precipitator dust is $\propto$ white phosphorus.

A common method of separating elemental phosphorus from its impurities is to heat impure phosphorus, such as phosphorus sludge, in a still. Water and elemental phosphorus vaporize and they are condensed thus obtaining phossy water and liquid phosphorus.

The $\propto$ which phosphorus had a melting temperature of 112° F. and a boiling temperature of 536° F. When phosphorus sludge is heated to a temperature high enough to obtain rapid volatilization of elemental phosphorus, part of the phosphorus is converted into an amorphous form called red phosphorus.

Red phosphorus has a low vapor pressure at the boiling temperature for $\propto$ white phosphorus, but it must be heated to about 750° F. before it has a vapor pressure as high as one atmosphere. But it is impractical to vaporize red phosphorus in a still because the steel deteriorates by reaction between phosphorus and iron at the higher temperatures. Red phosphorus remains in the still residue.

Red phosphorus does not burn when it is exposed to air. Particles comprising the still residue, including red phosphorus, can be aggregated into lumps suitable for smelting in an electric furnace. Since temperatures inside the electric furnace are as high as the range of 2600°–2700° F., red phosphorus is readily vaporized, condensed, and recovered as $\alpha$ white phosphorus when still residue is smelted.

EXAMPLE V

The disposal of phossy water by evaporation from contact with molten slag is applicable primarily for water containing dissolved elemental phosphorus and colloidal phosphorus particles. When phossy water contains settleable phosphorus particles, the concentration may be high enough to cause fuming. It was observed that slight fuming occurred on the surface of water in the settling pond when the elemental phosphorus content of the water was in the range of 2 to 3 parts elemental phosphorus per million parts of water. And fuming occurred over the surface of phossy water in a clarifier used to treat phossy water generated during the condensation of elemental phosphorus. The elemental phosphorus content of the clarified phossy water was 120 parts per million parts of water.

A mixture of phosphorus sludge and phossy water was stored in a tank at NFERC for 10 years. The phossy water was bleedoff from the phosphorus condensing system and it contained elemental phosphorus in the following forms.

Dissolved elemental phosphorus

Colloidal elemental phosphorus particles

Settleable elemental phosphorus particles

It is assumed that the original elemental phosphorus content of the phossy water was 1700 parts elemental phosphorus per million parts of water. After quiescent storage for 10 years, all the settleable particles of elemental phosphorus were settled into the lower layer of phosphorus sludge leaving only dissolved elemental phosphorus and colloidal elemental phosphorus particles. After 10 years' settling the phossy water contained one part elemental phosphorus per million parts of water.

The phossy water was recovered by using it to produce 13-38-0 grade of liquid suspension fertilizer. Phossy water was used instead of process water to make the fertilizer. There was no fuming from the surface of the phossy water.

Based on somewhat fragmentary data, the upper limit of elemental phosphorus content for phossy water disposal by evaporation to dryness is taken to be two parts elemental phosphorus per million parts of water. With this concentration as a maximum, phossy water will not be loaded with settleable phosphorus particles.

EXAMPLE VI

Following is a statement in the book, "Handbook of Toxic and Hazardous Chemicals," Marshall Sittig, Noyes Publications, 1981, under "Phosphorus."

Permissible Concentration in Water: The EPA((A-3) has proposed a criterion of 0.10 µg/l yellow (elemental) phosphorus for marine or estuarine waters. Further EPA (A-37) has suggested a permissible ambient goal of 1.4 µg/liter based on health effects.

The statement in "Handbook of Toxic and Hazardous Chemicals" provides a basis for a lower concentration of elemental phosphorus in phossy water. Phossy water containing less than 0.1 part elemental phosphorus per billion parts of water is outside the proposed criterion and does not require disposal as a hazardous material.

EXAMPLE VII

At some smelting furnaces molten slag is tapped and it flows into reservoirs. Molten slag is retained in the reservoirs by dikes made from tapping mud. The slag is cooled by applying process water on the surface of the pools of slag. The water evaporates from heat in the hot slag.

Slag cracks when it solidifies from cooling by the application of water. The pieces of slag are crushed to prepare pieces small enough to be used as ballast. Cooling the slag by the application of water on the surface is an important part of the operation because slag must be solidified, transported to the crushing area, and new retention dikes made with tapping mud between furnace taps.

Phossy water containing concentrations of elemental phosphorus in the range of 0.1 part elemental phosphorus per billion parts water to 2 parts per million can be used as the cooling medium instead of process water.

EXAMPLE VIII

A description of the operation of phosphorus condensers at NFERC is given in Chemical Engineering Report No. b 3, titled "Production of Elemental Phosphorus by the Electric-Furnace Method," 1952. An abridged version is given in the present example, as follows.

During normal operation the gas entered the precipitator at a temperature of 500° to 700° F., and then flowed to the spray condenser where it was cooled to a temperature of 130° to 150° F. by contact with phossy water. When phosphorus was pumped from the condenser sump, an equal volume of water was usually added to the sump. Phossy water then overflowed from the condensing system at rates ranging from 6 to 9 gallons per hour as more phosphorus condensed and accumulated in the condenser sump. In order to permit the settling of suspended phosphorus particles in the discharged phossy water, a settling tank and basin were provided which collected the overflowing phossy water. The 15,000-gallon settling tank was built originally for storage of phosphorus. A concrete basin with an area of 1,150 square feet and a volume of 24,000 gallons was provided under the settling tank. The excess phossy water entered the tank at one end and discharged at the opposite end. The phossy water then flowed through the basin under the tank to provide further settling of suspended phosphorus particles. Approximately 40 percent of the total elemental phosphorus was recovered in the settling tank and basin.

After settling, the phossy water was used in phosphoric acid units for the hydration of $P_2O_5$ to form acid and it was discharged into the settling pond shown in FIG. 1. After further settling in the pond, phossy water was discharged into a receiving stream called Pond Creek. Soda ash solution was added to the recirculating phossy water at the condenser to control the pH at a value of approximately 5.5. It was found in the laboratory that the titration of phossy water to a pH of 5.5 required a relatively small quantity of sodium carbonate, but a considerably greater quantity was required to titrate to higher pH values. For example, titration of the phossy water from a pH of 2 to a pH of 6 required about twice the quantity of sodium carbonate that was required to titrate the phossy water from a pH of 2 to a pH of 5.5.

EXAMPLE IX

When the phosphorus condensers were operated as described in example VIII phosphate ore was mined in Tennessee, the ore was beneficiated by washing out the clay, and the ore was agglomerated by nodulizing. The ore had to be heated to relatively high temperatures to nodulize the material and much fluorine was volatilized. In the case of example VIII the beneficiated ore had a $F:P_2O_5$ weight ratio 0.105 and the nodulized ore had a ratio of 0.080, indicating about 23 percent of the fluorine was volatilized.

It was reported in example VIII that 6 to 9 gallons per hour of phossy water was bled from the condensing system at one of the furnaces.

Tennessee phosphate ore which was amenable to beneficiation by washing became exhausted. The phosphate could be agglomerated at a lower temperature than the beneficiated phosphate because it contained clay. Only about 8 percent of the fluorine was volatilized during agglomeration as discussed in a publication entitled "Fluoride Recovery from Phosphorus Production," J. C. Barber and T. D. Farr, *Chemical Engineering Progress,* volume 66, No. 11. Furthermore, the unbeneficiated feedstock had to be upgraded and some uncalcined Florida pebble was used as feedstock. Florida phosphate concentrate was fed to the nodulizing kilns where it was incorporated in the agglomerates.

The overall result was that the $F:P_2O_5$ weight ratio in the phosphate fed to the electric furnaces was substantially greater than 0.080. With high $F:P_2O_5$ weight ratios the amount of fluorine volatilized from the phosphorus furnaces increases. The relationship between the $F:P_2O_5$ weight ratio in the feed material and the quantity of fluorine volatilized from the furnace is discussed in greater detail in ₄Fluoride Recovery from Phosphorus Production."

Fluorine volatilizes from the furnace as $SiF_4$ and in the condensing system this compound combines with phossy water in accordance with the following equation.

$$3SiF_4 + 2H_2O = 2H_2SiF_6 + SiO_2.$$

Soda ash solution was added to the recirculating phossy water at the condenser to control the pH at a value of approximately 5.5, as stated in example VIII. Fluosilicic acid was neutralized with soda ash to form the salt $Na_2SiF_6$ which has a low solubility and precipitates as a scale on heat transfer surfaces, in pumps, and in spray nozzles. The formation of scale on the equipment was the source of serious operating problems and it was necessary to prevent the precipitation of fluosilicate salts. The following operating steps were taken.

1. Phossy water used to condense elemental phosphorus was neutralized by adding alkaline ammonium compounds instead of soda ash. The ammonium compounds reacted with fluosilicic acid in the phossy water to form ammonium fluosilicate which has greater solubility in water than does sodium fluosilicate. Nevertheless, sodium and potassium fluosilicates continued to precipitate in phossy water because sodium and potassium compounds volatilize from the phosphorus furnace and sufficient sodium and potassium collects in the phossy water to form scales.

2. The concentration of fluorine in phossy water was controlled so that sodium and potassium fluosilicates did not precipitate. From experience it was determined that maximum concentration of about 10 grams F per liter of phossy water was sufficient to prevent scale deposits. Phossy water was bled from the phosphorus condensing system and replaced with process water to control the concentration of F. Bleedoff of phossy water at high rates increases the water pollution problem.

3. Sedimentation equipment was installed to treat the phossy water. The equipment is described in the publication "Waste Effluent; Treatment and Reuse," J. C. Barber, *Chemical Engineering Progress,* volume 65, No. 6. The water pollution problem was ameliorated by clarifying the phossy water and returning part of it to the phosphorus condensing system.

EXAMPLE X

Exhaust gasses from production of wet-process phosphoric acid contain fluorine as $SiF_4$ and HF. The exhaust gases are scrubbed with water from gypsum ponds, but this water contains small concentrations of sodium and potassium compounds. When scrubbers are used to absorb fluorine compounds from the exhaust gases, fluosilicate scale is deposited on the tower packing and the absorption efficiency is impaired.

Although fluosilicate salts have greater solubility in acidic gypsum pond water than in neutral or alkaline solutions, producers of wet-process phosphoric acid have resorted to the use of spray towers to avoid scaling of tower packing. However, fluorine compounds are acidic and absorption efficiency is lower than it would be with a neutral or alkaline scrubbing medium.

U.S. Pat. No. 4,613,494 discloses a process for absorption of the fluorine compounds in an ammoniacal solution having a pH in the range of 5.5 to 6.0. The solution is slightly acidic and little ammonia would be lost, but the absorption efficiency would be greater than with low-pH pond water. Fluosilicic acid in the scrubbing medium is converted to fluoride salts by adding ammonia to a bleedoff stream to increase the pH to the range of 8.5 to 9.0 as shown by the following equation.

$$H_2SiF_6 + 6NH_3 + 2H_2O = 6NH_4F + SiO_2.$$

The high-pH solution can be added to the scrubbing medium to maintain the pH of the scrubbing medium in the range of 5.5 to 6.0.

EXAMPLE XI

U.S. Pat. No. 4,968,499 discloses a process for the conversion of a hazardous waste stored at NFERC into phosphorus furnace feedstock. The waste is precipitator dust and it is estimated approximately 20,000 tons has accumulated at NFERC. Composition of precipitator dust is given in table 3.

TABLE 3

| Composition of Precipitator Dust | |
|---|---|
|  | Percent, dry basis |
| $P_2O_5$ | 27.7 |
| Elemental phosphorus | 0.3 |
| CaO | 13.8 |
| $SiO_2$ | 17.3 |
| $Fe_2O_3$ | 1.7 |
| $Al_2O_3$ | 3.6 |
| F | 6.3 |
| $K_2O$ | 17.4 |
| MgO | 0.9 |
| $MnO_2$ | 0.1 |
| $Na_2O$ | 3.1 |
| S | 0.1 |
| Total | 92.3 |

It is proposed to agglomerate the precipitator dust by tumbling it with a binder formed by reacting phosphoric acid with finely divided phosphate ore. The proportions of phosphoric acid and finely divided phosphate ore will be adjusted so that the reacted product will have a $P_2O_5$:CaO mole ratio of about 0.92 which is the mole ratio in concentrated superphosphate.

EXAMPLE XII

Agglomerates prepared in accordance with example XI will be dried by heating in the temperature range of 300° to about 800° F., as called for in U.S. Pat. No. 4,968,499.

Much technology is available on the preparation of concentration superphosphate in the publication, "Development of Processes for Production of Concentrated Superphosphate," G. L. Bridger, Tennessee Valley Authority, Chemical Engineering Report No. 5, 1949. Binder for agglomeration of precipitator dust will be prepared in accordance with technology reported in "Development of Processes for Production of Concentrated Superphosphate." The normal composition of the agglomerates will be about two-thirds precipitator dust and one-third binder (concentrated superphosphate). Larger proportions of binder may be used if needed to increase the grade (% $P_2O_5$) in the agglomerates.

The dried agglomerates can be smelted to produce about 5,292 tons of elemental phosphorus, thus providing a process to recycle 34,000 tons of precipitator dust (wet basis). At the current market price of $0.91 per pound, the value of the elemental phosphorus will be nearly $10 million.

From composition of precipitator dust in table 3 it is evident the F:$P_2O_5$ weight ratio is 0.227. Precipitator dust will be agglomerated with monocalcium phosphate binder prepared by a process identical to that used to make concentrated superphosphate. The F:$P_2O_5$ weight ratio of green concentrated superphosphate is about 0.032. Since feedstock will normally be comprised of about one-third binder and two-thirds precipitator dust, the F:$P_2O_5$ weight ratio of the feedstock will be about 0.162.

In example VIII it was reported that phossy water was bled from the condensing system at a rate of 6 to 9 gallons per hour when the F:$P_2O_5$ weight ratio of the feedstock was 0.080. And in example IX it was reported that precipitation of fluosilicate salts as scales caused condensing system operating problems when the F:$P_2O_5$ weight ratio was greater than 0.080.

At a F:$P_2O_5$ weight ratio 0.162, serious condensing system operating problems are expected when feedstock prepared from precipitator dust is smelted. The process to recycle precipitator dust was further developed to provide a method for coping with this problem.

It is well known that fluosilicic acid and fluosilicate salts are converted to ammonium fluoride by ammoniation to a pH in the range of 8.5 to 9.0. Ammonium fluoride is highly soluble in water and the fluosilicate scale problem can be corrected by this conversion. Silica is precipitated when fluosilicates are converted to ammonium fluoride.

The further development of the process to recycle precipitator dust is illustrated in FIG. 5. Phossy water can be bled from the condensing system and ammoniated to convert the fluosilicate salts to soluble fluorides. A slurry containing precipitated silica is formed. Phossy water from the process to convert precipitator dust into phosphorus furnace feedstock is added to the slurry and the mixture is clarified. Overflow from the clarifier is returned to the condensing system, but a stream of clarified phossy water is bled off to prevent an excessive concentration of dissolved ammonium phosphate since large concentrations of the salt may affect the physical characterittics of the phossy water.

Underflow from the clarifier will be distilled and a residue will be obtained which contains silica, combined phosphorus, and red phosphorus. The residue can be agglomerated, dried, and smelted to recover the phosphorus values and silica.

Water is lost from the condensing system as phossy water added to fluid fertilizers, as water vapor from the distillation of residue, and as water vapor in noncondensable gas. In accordance with the process illustrated in FIG. 6, phossy water obtained during the conversion of precipitator dust into furnace feedstock will be makeup water for the condensing system.

EXAMPLE XIII

FIG. 1 is a settling pond which was partially filled with phosphorus sludge. U.S. Pat. No. 4,608,241 discloses a process for treating the phosphorus sludge by distilling it to vaporize phosphorus and water and thereby separate the volatile materials from the nonvolatile residue. The residue will be agglomerated and smelted to produce elemental phosphorus in order to recycle the hazardous waste.

As is example XI agglomerated residue will contain ∝ white phosphorus, or red phosphorus, or both, depending on the still temperature.

Chemical composition of elemental phosphorus-free phosphorus sludge was reported in U.S. Pat. No. 3,084,029 and this analysis is given in table 4.

TABLE 4

Analysis of Phosphorus Sludge[a]

| | Percent, dry basis |
|---|---|
| $P_2O_5$ | 32 |
| CaO | 8 |
| $SiO_2$ | 7 |
| F | 23 |

[a]Analysis is on an elemental phosphorus-free basis.

The still residue has a F:$P_2O_5$ weight ratio of 0.719 but after combining it with monocalcium phosphate the ratio will be reduced to 0.491. In this case the F:$P_2O_5$ weight ratio is 6.1 times the ratio of 0.080 in example VIII. In example VIII the phosphorus condensing system could be operated at a relatively low phossy water bleedoff rate of 6 to 9 gallons per hour. Much fluorine will be volatilized when the phosphorus sludge is distilled, residue is agglomerated, and agglomerates are dried. However, the volatilized fluorine will be collected in the phossy water, and the phossy water will be used as makeup water for the phosphorus condensing system as described in example XII. A F:$P_2O_5$ weight ratio of 0.491 in the green agglomerates is tantamount to smelting feedstock having this F:$P_2O_5$ ratio.

EXAMPLE XIV

One of the objectives of the present invention is to provide a process for the recovery of phossy water when the phossy water contains dissolved elemental phosphorous, colloidal particles of elemental phosphorus, and settleable particles of elemental phosphorus. When phossy water is generated in phosphorus condensing systems, water comes in intimate contact with gas containing elemental phosphorus vapor. Some of the elemental phosphorus condenses as colloidal particles and as settleable particles.

A publication, "Waste Effluent; Treatment and Reuse," J. C. Barber, *Chemical Engineering Progress,* volume 65, No. 6, describes a process for clarifying phossy water generated in phosphorus condensing systems by sedimentation means. Clarified phossy water was returned to the condensing system. Phossy water containing 1700 ppm of elemental phosphorus was bled from the condensing system and clarified. The clarified overflow contained 120 ppm of elemental phosphorus. Although the clarifier removed about 93 percent of the elemental phosphorus, at an elemental phosphorus concentration of 120 ppm it is obvious that the elemental phosphorus content of clarified phossy water was mainly settleable particles. After settling for 10 years the elemental phosphorus content was reduced to about 1 ppm.

A large (but unknown) quantity of phosphorus sludge has accumulated in the settling pond shown in FIG. 1. It is planned to recover the phosphorus sludge by distillation wherein elemental phosphorus will be vaporized and then condensed by contacting the phosphorus vapor with water as in the phosphorus condensing system. The elemental phosphorus content of the phossy water is expected to be about 1700 ppm, but clarification is expected to reduce the elemental phosphorus content to about 120 ppm.

About 20,000 tons of precipitator dust is stored at NFERC and it is planned to recover this waste by agglomerating the precipitator dust and then heating the agglomerates to harden them. Elemental phosphorus will be vaporized and the vapor will be condensed by contacting the vaporized gases with water. Phossy water containing about 1700 ppm of elemental phosphorus will be generated.

It is planned to conduct an engineering study at an existing submerged-arc electric furnace to investigate the smelting of feedstock prepared from precipitator dust. Part of the engineering study will include cooling the furnace gas by contacting the furnace gas with phossy water containing ammonia. Phossy water generated by contacting phosphorus vapor with water will be ammoniated to a pH in the range of 8.5 to 9.0 to convert fluosilicate to ammonium fluoride and the resulting slurry will be clarified by a sedimentation method or by centrifugation, or both.

Data from the engineering study will provide a basis for the design of a phossy water recovery system. For example, mixing phossy water with slurry from the amoniator, as shown in FIG. 5, may not be the preferred arrangement. The preferred arrangement may be addition of phossy water to the ammoniator.

A larger than normal makeup water rate may be needed. An evaporator may be provided to concentrate clarified phossy water. Increase of water vapor loss by evaporation will provide larger additions of phossy water as makeup.

The diagram shown in FIG. 5 may not be the optimum for recovery of phossy water. However, the diagram provides a guide for conducting the engineering study. Final arrangement of the equipment will depend on results of the engineering study.

I claim:

1. A process for the disposal of water containing elemental phosphorus, said process comprised of the following steps:

(a) smelting phosphorus-containing solid in a submerged-arc electric furnace to form molten slag;

(b) removing said molten slag from electric furnace in step (a) by tapping;

(c) granulating the molten slag from step (b) by quenching said slag with water containing elemental phosphorus;

(d) evaporating said quenching water from step (c) to form steam;

(e) volatilizing the elemental phosphorus in step (c) to form phosphorus vapor;

(f) oxidizing the elemental phosphorus vapor in step (e) by contacting said vapor with ambient air to form phosphorus pentoxide;

(g) dispersing steam formed in step (d) and phosphorus pentoxide formed in step (f) into ambient air; and (h) separating the granulated slag formed in step (c).

2. Process of claim 1 wherein phosphorus containing solid smelted in step (a) is agglomerated phosphate ore.

3. Process of claim 1 wherein maximum elemental phosphorus content of water ins step (c) is 2 parts per million.

4. Process of claim 1 wherein molten slag in step (c) is quenched by applying water containing elemental phosphorus on the slag surface.

* * * * *